United States Patent

[11] 3,584,900

| [72] | Inventors | Fred A. Lennon<br>Chagrin Falls;<br>Emery J. Zahuranec, Solon, both of, Ohio |
|---|---|---|
| [21] | Appl. No. | 760,576 |
| [22] | Filed | Sept. 18, 1968 |
| [45] | Patented | June 15, 1971 |
| [73] | Assignee | Sno-Trik Company<br>Solon, Ohio |

[54] HIGH-PRESSURE SEALING AND GRIPPING DEVICE
26 Claims, 10 Drawing Figs.

[52] U.S. Cl............................................. 285/14,
285/341, 285/382.7
[51] Int. Cl........................................ F16l 19/08,
F16l 55/00
[50] Field of Search.......................................... 285/382.7,
341, 342, 334.4, 14, 110, 356, 323

[56] References Cited
UNITED STATES PATENTS

| 2,484,815 | 10/1949 | Crawford | 285/382.7X |
| 3,215,457 | 11/1965 | Teeters | 285/382.7X |
| 3,362,731 | 1/1968 | Gasche et al. | 285/356X |
| 1,872,536 | 8/1932 | Weatherhead et al. | 285/382.7X |
| 1,888,343 | 11/1932 | Bohlman et al. | 285/382.7X |
| 2,679,411 | 5/1954 | Moore | 285/14 |
| 2,687,315 | 8/1954 | Courtot | 285/382.7X |
| 3,069,188 | 12/1962 | Crawford | 285/382.7X |
| 3,103,373 | 9/1963 | Lennon et al. | 285/382.7X |
| 3,215,457 | 11/1965 | Teeters | 285/382.7X |

FOREIGN PATENTS

| 957,532 | 8/1949 | France | 285/342 |
| 368,365 | 2/1939 | Italy | 285/323 |
| 348,114 | 5/1931 | Great Britain | 285/341 |

*Primary Examiner*—Thomas F. Callaghan
*Attorney*—Fay, Sharpe & Mulholland

ABSTRACT: A fitting for a conduit having a frustoconical forwardly converging sealing surface at one end thereof. A coupling body is provided with a bore, a counterbore for receiving the conduit, a frustoconical sealing surface, and a frustoconical camming mouth. A front and back ferrule are received on the conduit. The front ferrule is provided with a nose portion. The back ferrule is provided with a back face adapted to be engaged by the thrust surface of a coupling nut threadedly engaged with the coupling body. The relationship of the parts is such that upon application of a substantially axial compressive force to the ferrules they become deformed into gripping engagement with the conduit. Torquing of the coupling nut causes the conduit to be driven forward advancing the conduit sealing surface into sealing abutment with the coupling body sealing surface establishing a high integrity seal on a diameter less than the inside diameter of the ferrules in a deformed state.

PATENTED JUN 15 1971

INVENTORS.
FRED A. LENNON &
EMERY J. ZAHURANEC

BY Fay, Sharpe & Mulholland

ATTORNEYS

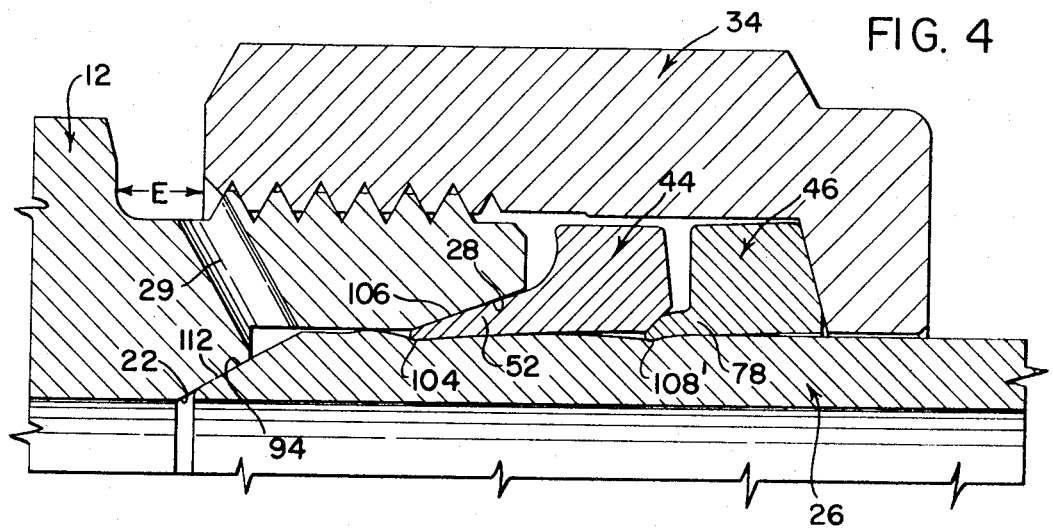
FIG. 4
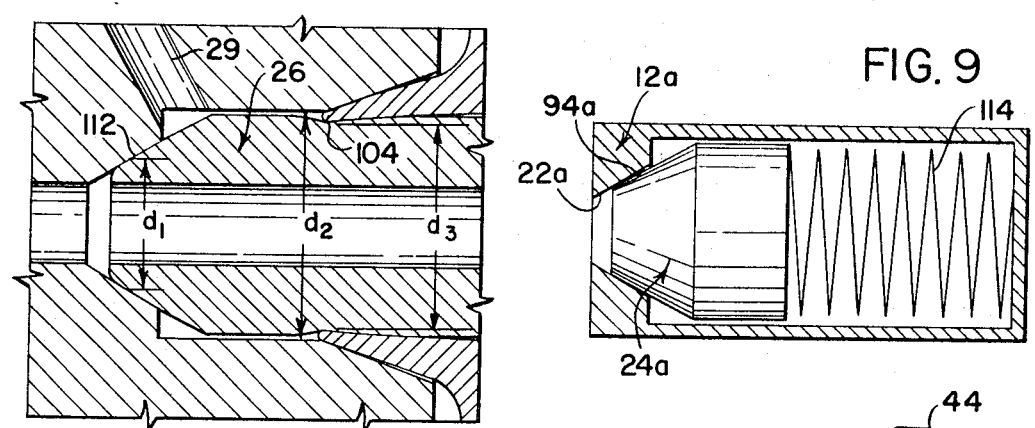
FIG. 7
FIG. 9
FIG. 8
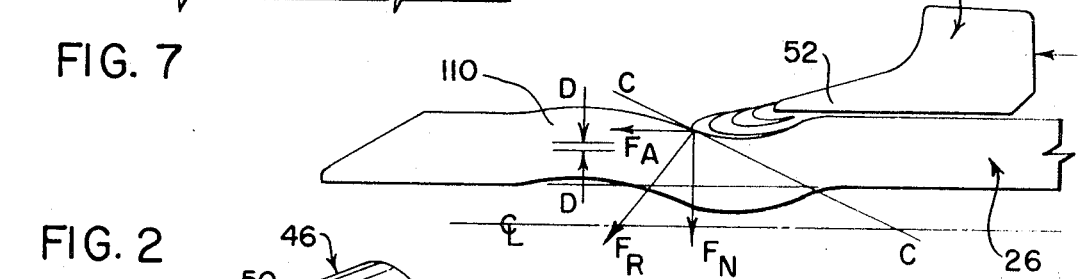
FIG. 2
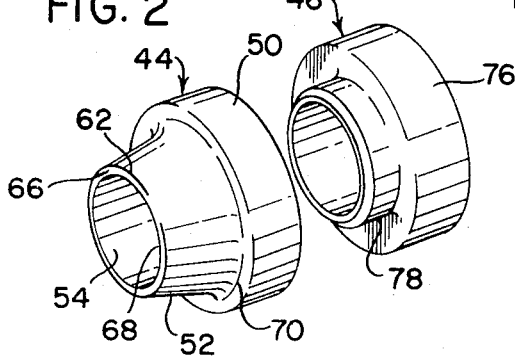
INVENTORS.
FRED A. LENNON &
EMERY J. ZAHURANEC
BY
Fay, Sharpe & Mulholland
ATTORNEYS

PATENTED JUN 15 1971

INVENTORS.
FRED A. LENNON &
EMERY J. ZAHURANEC
BY
*Fay, Sharpe & Mulholland*
ATTORNEYS

HIGH-PRESSURE SEALING AND GRIPPING DEVICE

BACKGROUND OF THE INVENTION

This invention relates to a sealing and gripping device for conduit and in particular to a sealing and gripping device suitable for high-pressure application.

Several designs for a high-pressure conduit or tube coupling have been proposed by the prior art. To better understand the contribution of the instant invention, a brief description of several of the prior art high-pressure tube couplings will be made.

In U.S. Pat. No. 2,679,411 to Moore a high-pressure tube coupling utilizing a collar and nut is described. The collar is screw threadedly received on the tube end and cooperates with the nut to force the conical end of the tube into contact with a conical surface defined in the coupling body. A leak path is provided in the event that the conical end of the tube has not been properly seated with the conical surface in the coupling body. A major disadvantage of the tube coupling as shown in the Moore patent is the threaded connection between the tube and the sleeve. The provision of threads on the external surface of the tube is considered to be disadvantageous for two reasons:
1. Since most tubing is cut to size on the site, the installer must form the thread on the tubing. Because job site conditions are not optimum, the thread so formed on the tubing may not be as precise as required to hold thrust and to maintain a seal at high pressures, and
2. Since the thread is cut into the tube wall, the tube wall will subsequently be weakened and points of stress concentration will be established. For example, a ¼-inch O.D. tube with a wall thickness of 0.078 inch and a thread depth of 0.023 inch will have an effective wall thickness of 0.055 inches or approximately two-thirds of the original wall thickness.

In U.S. Pat. No. 2,313,323 to Cowles, a tube coupling is described the design of which could have application in high pressure systems. In the Cowles design an annular groove is defined in the exterior surface of the tube. A split collar is inserted in the annular groove which cooperates with a coupling nut to provide a driving surface for advancing the tube into engagement with the coupling body. In many respects the provision of an annular groove in the exterior surface of the tube is similar to the provision of threads since screw threads may be considered a plurality of annular grooves. Therefore, the remarks with respect to the Moore patent noted above are to a large degree applicable to the Cowles design. A singular annular groove may serve the useful purpose of providing a driving surface for advancing the tube into the coupling body. However, the reduced tubing wall thickness, the stress concentration points thus established, and the general difficulty of providing annular grooves in a tube surface at the job site render coupling designs of this type inadequate for sustained high-pressure operation.

The design of the tube coupling of U.S. Pat. No. 3,326,582 to Currie utilizes a ferrule threaded upon the tube and including a deformable sealing and vibration dampening portion at its opposite ends. Since the ferrule in the Currie design is screw threadedly received on the tube end, Currie is thus very similar to the Moore concept described above in that screw threads are utilized as a thrust surface against which a coupling nut coacts for the purpose of advancing the tube end into sealing engagement with either the coupling body or a ferrule element.

BRIEF DESCRIPTION OF THE INVENTION

Briefly described, the sealing and gripping device of this invention comprises a coupling body having a bore, a counterbore for receiving a conduit having a substantially cylindrical external surface and a sealing element at one end thereof, a frustoconical sealing surface adapted to cooperate with the sealing element of the conduit, and a rearwardly opening, generally frustoconical camming mouth extending from said counterbore and adapted to surround the conduit when inserted in the coupling body. The conduit is gripped by means of a pair of ferrules adapted to be snugly received over the exterior of the conduit.

The front ferrule is defined by a tapered external forward surface portion adapted to engage the camming mouth of the coupling body. A frustoconical surface is defined at the radial base of the front ferrule and is adapted to cooperate with a nose portion of the back ferrule. The rearward end of the back ferrule is defined by a generally frustoconical rearwardly converging backface adapted to cooperate with a complementary surface on a coupling nut. The coupling nut is threadedly engaged with the coupling body and with the camming mouth of the coupling body defines an annular chamber surrounding the conduit within which the front and back ferrules are received.

Upon initial torquing of the coupling nut, the front ferrule becomes slightly deformed thereby to come into contact with the conduit and induce a compression wave therein. The wave-inducing force imparted to the conduit by the front ferrule includes a first force component normal to the axis of the front ferrule and acting to maintain the front ferrule in contact with the conduit, and a second force component parallel to the axis of the front ferrule and acting to advance the compression wave toward the end of the conduit thus to advance the conduit sealing element into sealing abutment with the coupling body sealing surface. Upon further torquing of the coupling nut, the front ferrule becomes more deformed and initial deformation of the back ferrule begins to take place. This deformation of the ferrules preloads elastically the end of the conduit to impose a thrust load on the coupling body-sealing surface. The relationship of the parts is such that the magnitude of the thrust load imposed by the ferrules is substantially equal to or greater than the hydraulic force within the conduit acting against the sealing element in a direction tending to break the seal. Further, the relationship of the parts and the materials from which they are made is such that the conduit remains sufficiently elastic and without buckling upon deformation of the ferrules thus to maintain a thrust load on the coupling body sealing surface.

The ferrules of this invention, therefore, function not only to grip the external tube surface but also to thrust the conduit into sealing engagement with the coupling body and subsequently elastically preload the end of the conduit in order to counteract the hydraulic force within the conduit acting against the sealing surfaces in a direction tending to break the seal.

BACKGROUND OF FERRULE COUPLINGS

Swage action gripping devices of the general type as that here involved are not, in and of themselves, new to the trade. Tube couplings utilizing ferrules operating to swage the surface of the tube have received notable acceptance in the industry because they afford several advantages. Tube couplings of the type shown in the Lennon et al. U.S. Pat. No. 3,103,373 have been particularly well received since the ferrules grip by a swage action and do not bite into the surface of the tube to be coupled. The tube is therefore not weakened by the action of the ferrules.

Notwithstanding the favorable aspects generally of ferrule-type couplings of the type described, swage action couplings have heretofore been considered limited to working pressures not exceeding 15,000 p.s.i. depending, of course, on the particular safety factor selected. With the advent of high-pressure systems utilizing heavy-walled stainless steel tubing, it has generally been felt that the use of ferrulelike couplings for gripping and sealing is no longer appropriate.

It is not unusual, therefore, that with the recent expanded use of heavy-walled tubing (and other tubing having increased strength characteristics) in high-pressure systems that coupling designers would resort to the use of screw threads or annular grooves for the purpose of providing a firm gripping surface on the tube. The disadvantages of these designs have been previously described and further reference to them is believed to be unnecessary. The problem confronting the manufacturers of sleeve or ferrule-type couplings has been to build a fitting that is as strong as the tube yet which provides a substantial grip necessary for high-pressure application. The problem of achieving a proper grip of the tube end by the ferrules is particularly acute in instances where relatively heavy-walled stainless steel tubing is used. The force required to swage, bite, indent or otherwise grip the wall of high-pressure stainless steel tubing was heretofore considered to be so great as to be virtually impossible to achieve by means of sleeves or ferrules.

With the foregoing problems in mind, it is a general object of the invention to provide an improved gripping device for use with high-pressure applications.

It is a further object of this invention to provide a high-pressure tube coupling of the sleeve or ferrule type, and wherein the necessity for providing external threads or preformed annular grooves on the tube end has been eliminated.

It is an additional object of the invention to provide a tube coupling that does not involve significantly weakening the tubing so that the high-pressure limit of the fitting will be governed only by the burst strength of the tubing as originally provided.

Other and more specific objects of the invention will be apparent from the detailed description to follow.

THE INVENTION DESCRIBED

A more complete description of the invention will now be had with reference to the accompanying drawings in which:

FIG. 2 is an exploded perspective view of the front and back ferrules which make up a part of the sealing and gripping device of FIG. 1;

FIG. 4 is an enlarged fragmentary view, in longitudinal section, of the sealing and gripping device of FIG. 1, showing the relative positions of the components when makeup is complete;

FIG. 7 is an enlarged fragmentary view, in longitudinal section, of the conduit end and the coupling body and showing the relationship of the front ferrule in a deformed state to the external diameter of the conical tip at the sealing diameter of the conduit and the coupling body;

FIG. 8 is a schematic representation of the forces imposed on the external surface of the conduit by the front ferrule as the front ferrule is deformed during makeup;

FIG. 9 is a schematic representation of a mechanical equivalent of the elastic preloading of the tube end by the ferrules after takeup;

Figure 10:
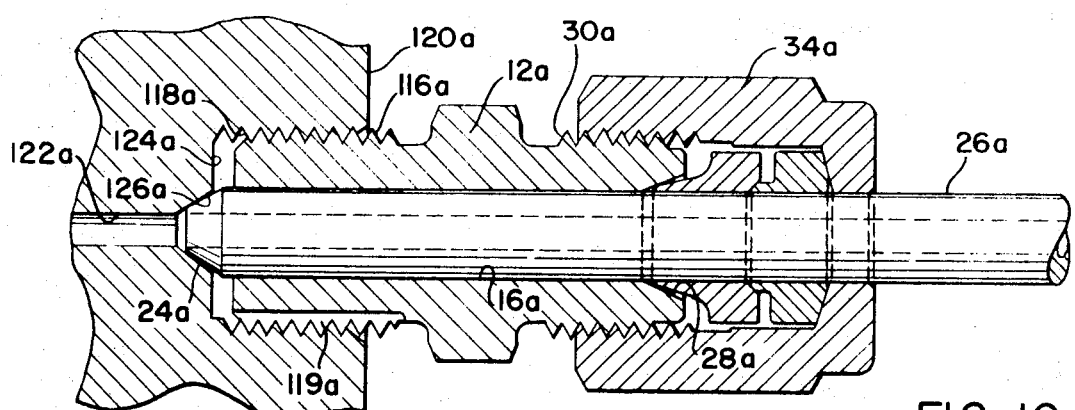

FIG. 10 is an enlarged fragmentary view, in longitudinal section, of the sealing and gripping device embodying the principles of this invention and showing a composite structure of the coupling body comprised of a male connector element and a connector member in which the coupling body bore and sealing surface are defined by the connector member, and in which the coupling nut is in fingertight relationship with the male threads on the male connector element.

Figure 1:
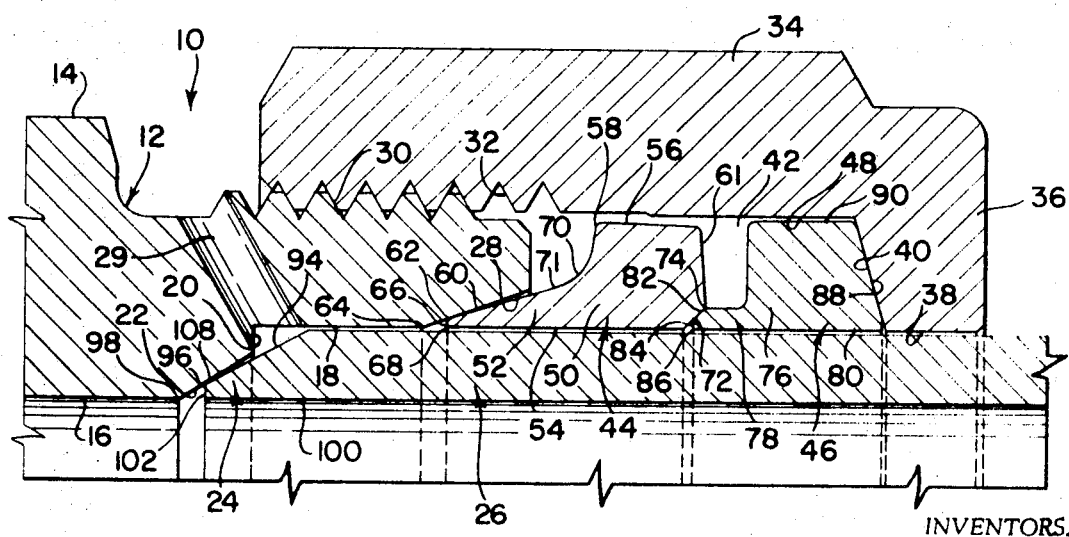
FIG. 1 is a fragmentary view, partly in longitudinal section, of a sealing and gripping device embodying the principles of this invention.

Referring now more particularly to the drawings, FIG. 1 shows a sealing and gripping device indicated generally at 10 embodying the principles of this invention. The sealing and gripping device 10 includes a coupling body 12 which may be provided intermediate its ends with tool pads 14 or other wrench-engaging surfaces. In FIG. 1, coupling body 12 is a unitary structure. As will be developed further the coupling body may be defined as a composite structure comprised of two or more individual elements which when secured together define a coupling body. Extending longitudinally through the coupling body 12 is a substantially cylindrical bore indicated generally at 16. Bore 16 is provided at one end with a coaxial substantially cylindrical counterbore 18 having a bottom forming a radially extending shoulder 20. As shown in FIG. 1, shoulder 20 extends radially inwardly a relatively short distance where it intersects a generally frustoconical sealing surface 22; however, in some cases it may be desirable to extend surface 22 radially outwardly until it merges directly with the cylindrical wall defining counterbore 18. Sealing surface 22 emanates from bore 16 a predetermined axial extent and is adapted to surround a sealing element (in the form of a conical tip 24) of conduit 26 when inserted in the coupling body 12. Sealing surface 22 forms a predetermined forwardly extending half angle with respect to the axis of bore 16. The character of this surface will be described with greater particularity hereafter.

Throughout the description of the invention the angle defined by a frustoconical surface in section with respect to its axis will be referred to as the half angle. Half angle is thus to be differentiated from the full or included angle (defined by the complete frustoconical surface in section), which is twice the half angle.

A bleed passage 29 extends from an external surface of the coupling body into the counterbore 18 adjacent shoulder 20 for a purpose to be detailed more fully as the description proceeds.

The counterbore 18 at its outer terminal portion is provided with a coaxial annular tapered or frustoconical camming mouth 28 which in the embodiment of FIG. 1 is formed on a half angle from about 15° to about 25° with respect to the axis of counterbore 18.

In the form of the invention shown in FIG. 1 the coupling body 12 is provided, on the end portion thereof in which the camming mouth 28 is defined, with male thread means 30 for mating engagement with female thread means 32 provided on coupling nut 34. The end of the coupling nut 34 opposite the threads 32 is formed with an internal annular flange 36 defining a generally cylindrical opening 38 coaxial with and of approximately the same diameter as the counterbore 18.

The face of flange 36 opposed to the camming mouth 28 defines a frustoconical driving or thrust surface 40 coaxial with both the camming mouth 28 and the counterbore 18.

It will be observed that the annular tapered camming mouth 28, the internal surfaces of coupling nut 34 and the external surface of conduit 26 together define an annular chamber 42 within which the front and back ferrules 44 and 46 respectively are adapted to be received.

In the embodiment illustrated in FIG. 1, the driving or thrust surface 40 of the coupling nut 34 is separated from the female threads 32 by an annular internal surface 48.

FRONT FERRULE

As may be seen from FIGS. 1 and 2, the front ferrule 44 is defined by a body portion 50 and a nose portion 52. A front ferrule bore 54 is defined in the front ferrule and is of a diameter slightly larger than the external diameter of conduit 26 such that the front ferrule may be snugly received upon the conduit as shown at FIG. 1. The front ferrule body portion 50 is substantially in the form of a right circular cylinder having an outside diameter slightly less than the diameter of the annular internal surface 48 of the coupling nut 34. A slight radial clearance is thus defined between the front ferrule 44 and internal surface 48 of the coupling nut 34. In the preferred embodiment of this invention a slight taper is provided on the outer surface 56 of body portion 50 extending from a high point at 58. Thus, in the preferred embodiment the outer surface 56 of the front ferrule is actually frustoconical in shape although, since the degree of taper is slight, the outer surface 56 may be defined as substantially cylindrical.

The right circular forwardly converging frustoconical nose portion 52 of front ferrule 44 is defined by a tapered external forward surface portion 60 terminating at the forward end of the ferrule with a curved apical zone 62 seated against the camming mouth 28 in initial nonpressure contact along a line of predetermined diameter adjacent to but spaced from the smaller end 64 of camming mouth 28. The curved apical zone 62 is joined to the wall defining bore 54 of the front ferrule by a generally radially extending front face 66. A corner 68 is defined at the intersection of the radial front face 66 and the wall defining the bore 54.

Surface 60 defines a half angle with respect to the axis of counterbore 18 that is less than the half angle defined by the camming mouth 28. In the illustrated embodiment of the invention surface 60 defines a half angle of from about 10° to about 20° with respect to the axis of counterbore 18. As has been previously pointed out, camming mouth 28 defines a half angle of from about 15° to about 25° with respect to the axis of counterbore 18. It is desirable to maintain a half angle differential of from about 5° to about 15° between the cooperating tapered surfaces of the front ferrule and coupling body.

As has been noted, nose portion 52 of front ferrule 44 is in the form of a right circular forwardly converging conical frustum. Surface 60 of nose portion 52 is joined to body portion 50 by a generally concave annular surface 70. A radial base 61 is provided on body portion 50. A coaxial rearwardly opening generally frustoconical surface or camming mouth 72 joins the radial base 61 of the front ferrule with the wall defining bore 54 of the front ferrule.

It will be observed from FIG. 1 that specific relationships exist between various surfaces of the front ferrule 44. For example, the radial extent of surface 72 at its intersection 74 with radial base 61 (i.e. the perpendicular distance between the point of intersection 74 and the wall defining bore 54) is substantially less than one-half the radial thickness of body portion 50 or, alternately described, substantially less than one-half the greatest difference between the inner and outer radii of body portion 50. It will further be observed from FIG. 1 that the axial length of body portion 50 (as measured between radial base 61 and point 71) is about the same as the axial length of the nose portion 52 (as measured between front face 66 and point 71). Furthermore, the wall thickness of the nose portion 52 at point 71 is approximately one-half the wall thickness of the body portion 50 or, alternately described, about one-half the greatest difference between the inner and outer radii of the body portion. The radial extent of the front face 66 of nose portion 52 is normally less than the radial extent of camming mouth 72 at its intersection 74 with radial base 61.

BACK FERRULE

Attention will now be directed to the back ferrule 46 as shown in FIGS. 1 and 2. Back ferrule 46 is comprised of a body portion 76 and a nose portion 78. A back ferrule bore 80 extends through both the body portion and the nose portion of the ferrule. As with the front ferrule bore 54, back ferrule bore 80 has a diameter that is slightly larger than the external diameter of conduit 26 such that the back ferrule may be snugly received upon conduit 26 adjacent the front ferrule and rearwardly thereof. Body portion 76 of back ferrule 46 is of a right circular substantially cylindrical shape the outer diameter of which is about the same as the outer diameter of body portion 50 of front ferrule 44. In the illustrated form, nose portion 78 of back ferrule 46, intermediate its ends, is substantially cylindrical in shape but under certain conditions may have a moderate external taper. The greatest wall thickness of nose portion 78 is substantially less than one-half the greatest difference between the inner and outer radii of body portion 76. Stated another way, the greatest wall thickness of nose portion 78 is substantially less than one-half the wall thickness of the body portion 76.

The forward end of nose portion 78 is defined by an external forwardly converging generally frustoconical surface 82 adapted to be received within camming mouth 72 and at it greatest diameter has a radial extent about the same as the radial extent of such camming mouth. Reasonable variations in this relationship are permissible, however. The half angle defined by these surfaces may coincide or may define a taper difference as much as 15° or more depending upon various conditions. In any event, surface 72 will ordinarily define a half angle ranging from about 30° to about 50° with respect to the axis of counterbore 18. Surface 82 is joined to the wall-defining bore 80 of the back ferrule by a generally radially extending front face 84. A corner 86 is defined at the intersection of front face 84 and the wall-defining bore 80.

The rearward end of back ferrule 46 is provided with a generally frustoconical rearwardly converging back face 88 adapted to be engaged by the frustoconical driving or thrust surface 40 of the coupling nut 34. In the embodiment of the invention as shown in FIG. 1, the thrust surface 40 and the back face 88 are generally disposed at a half angle of about 60° to about 90° with respect to the axis of counterbore 18 and need not necessarily coincide. Preferably, the half angle will be somewhat less than 90°.

Specific relationships of the various surfaces of the back ferrule 46 will be evident from FIG. 1. As has previously been noted, the radial thickness of the nose portion 78 is substantially less than one-half the radial thickness of the body portion 76. Similarly, the axial length of the nose portion 78 is substantially less than one-half the axial length of the body portion 76.

CONDUIT

A brief reference will now be made to the sealing element or the conical tip 24 of conduit 26. It has previously been noted that conduit 26 must be relatively thick walled for high-pressure application. A sealing element in the form of a sealing surface 94 is defined on conduit 26 as by means of a suitable coning tool. Sealing surface 94 is generally frustoconical in shape and terminates at the forward end of the conduit with a curved apical zone 96 adapted to be seated against sealing surface 22 of the coupling body 12 along a line of predetermined diameter and adjacent to but spaced from the smaller end 98 of sealing surface 22. The curved apical zone 96 is joined to the wall defining the bore 100 of the conduit by a generally radially extending front face 102. It is to be noted that the axial extent of the sealing surface 94 is ordinarily about equal to or greater than the axial extent of the sealing surface 22. Furthermore, sealing surface 94 defines a half angle with respect to the axis of counterbore 18 less than that defined by sealing surface 22 although in some cases these half angles may be more or less coincident. In the preferred embodiment of this invention the sealing surface 22 defines a half angle of approximately 30° with respect to the axis of counterbore 18. In the preferred embodiment of this invention sealing surface 94 defines a half angle of approximately 28° with respect to the axis of counterbore 18. The difference in the half angles defined by the respective sealing surfaces of the preferred embodiment is thus approximately 2°. This invention should not be considered as limited to the specific angles described as it has been determined that the difference in the half angles defined by the sealing surfaces may be within the range of about 1°—5°.

The metal from which the conduit 26 is fabricated must be of a quality not only to withstand the relatively high hydraulic pressures which will be experienced, but for best results must also have a modulus of elasticity, yield strength, and ultimate strength in a specific relationship such that the ferrules preload elastically the end of the conduit during makeup of the coupling nut as will be described more fully hereafter.

OPERATION

The operation of the invention as shown in the embodiment of FIG. 1 will now be described with reference to FIGS. 1, 2 and 4. The ferrules 44, 46 are initially positioned as shown in FIG. 1 with coupling nut 34 advanced over the coupling body 12 a distance sufficient to impose a fingertight load on the ferrules. Thereafter conduit 26 is inserted into the coupling nut and coupling body a distance sufficient to permit the curved apical zone 96 to be seated against sealing surface 22 in initial nonpressure contact along a line of predetermined diameter as at 108, FIG. 1. Upon initial torquing of coupling nut 34 a substantially axial compressive force will be imparted to back ferrule 46 by means of thrust surface 40. Back ferrule 46 will in turn exert a substantially axial thrust or compressive force against the front ferrule 44. Front ferrule 44 consequently will be forced into engagement with camming mouth 28 at the curved apical zone 62. As a consequence of further torquing of the coupling nut 34 the nose portion 52 of the front ferrule will be progressively wedged or cammed inwardly into engagement with the exterior surface of conduit 26 as at 104, FIG. 4. At the same time, the initial line contact between the curved apical zone 62 and camming mouth 28 spreads into an area engagement as at 106, FIG. 4.

With further torquing of coupling nut 34 the front ferrule 44 continues to move forwardly and inwardly, but at a reduced rate as a result of the increasing resistance imposed by the surface of conduit 26 and camming mouth 28. As resistance to movement of front ferrule 44 continues to build up, and the rate of front ferrule movement slows, the stiffness of the relatively short nose portion 78 of back ferrule 46 is gradually overcome, as a result of which a progressive inward wedging or camming of the nose portion 78 of the back ferrule into engagement with the surface of conduit 26 as at 108', FIG. 4 is commenced.

In the illustrated embodiment of FIG. 1 a device has been shown requiring approximately one and a fraction turns of the coupling nut 34 to make up the coupling although, of course, the number of turns required is dependent upon many factors such as the pressures with which the device is to be used and the lead of the threads 30, 32.

The action of the ferrules just described is sequential in nature providing for timed and coordinated gripping by the front and back ferrules during makeup. While broadly speaking, the concept of sequential gripping by a pair of ferrules is known in the art as referenced by U.S. Pat. No. 3,103,373 to Lennon et al., the ferrule structure of this invention produces results in high pressure conduit heretofore unknown to the art as will be described more fully hereafter.

SEALING ON MAKEUP

Attention will now be directed to the establishment of a fluidtight seal at the interface of the sealing surface 94 of conduit 26 and sealing surface 22 of coupling body 12 during makeup of the coupling. As has previously been described, the coupling is normally initially assembled fingertight and thereafter the conduit 26 is inserted through the coupling nut 34 and the ferrules 44 and 46 a sufficient distance such that the curved apical zone 96 of the conduit will be seated against the sealing surface 22 in initial nonpressure contact along a line of predetermined diameter as at 108, FIG. 1. Upon initial torquing of the coupling nut 34 the nose portion 52 of front ferrule 44 becomes deformed as it is wedged into engagement with camming mouth 28. Under the influence of camming mouth 28, the nose portion 52 will be forced into engagement with the conduit 26 by a resultant force having a first force component $F_N$ (FIG. 8), normal to the axis of the ferrule 44 and acting to maintain ferrule 44 in contact with conduit 26, and a second force component $F_A$ parallel to the axis of ferrule 44.

The force relationship is more clearly shown in FIG. 8 wherein the progressive movement of front ferrule 44 is schematically shown. As a result of the establishment of the normal force $F_N$ an elastic compression wave 110 or a buttress is formed in the conduit ahead of the front ferrule 44. The force component $F_A$ acting at a line of contact C-C, FIG. 8, against wave 110, advances the elastic wave toward the free end of the conduit.

The amplitude of the elastic wave 110 will vary depending upon the degree of deformation of the nose portion 52 of the front ferrule 44. In FIG. 8, this amplitude is shown greatly exaggerated by the arrows D-D. The effect of force component $F_A$ acting against the elastic wave 110 is to force the wave along the conduit thus to advance the conduit sealing surface 94 into sealing abutment with the coupling body sealing surface 22 where a fluidtight seal is established. Further torquing of the coupling nut produces greater deformation of the nose 52 to increase the amplitude of elastic wave 110 and thus increase the sealing pressure exerted by sealing surface 94 against sealing surface 22. The original line of contact 108 of the conduit 26 with the coupling body 12 as shown in FIG. 1 now becomes a sealing area at 112, FIG. 4. Theoretically, since the amplitude of elastic wave 110 should increase with increased deformation of nose 52 of the front ferrule 44, the sealing thrust imparted to the conduit end by the ferrule should similarly increase. Again, theoretically, a point can eventually be reached where increased torquing of the coupling nut produces deformation of the front ferrule to the extent that buckling of the conduit takes place. Should this occur, there is a risk that the integrity of the seal may be disrupted.

The discussion above relating to the establishment of a compression wave through deformation of the front ferrule is also applicable to deformation of the back ferrule 46. Thus, inward movement of nose portion 78 of back ferrule 46 serves to induce a second elastic compression wave (not shown) in the conduit 26 similar to that described with reference to FIG. 8. The net effect of the second elastic wave induced by the back ferrule is to assist the first elastic wave induced by the front ferrule in preloading the conduit end as will be described below.

In FIG. 9, there is shown schematically an approximate mechanical equivalent of an elastically preloaded conical tip. Thus, in FIG. 9 an element 24a (which may be considered equivalent to conical tip 24 of FIG. 1) having a sealing surface 94a is maintained in preloaded engagement with sealing surface 22a by means of spring 114, which functions in a manner roughly equivalent to elastic compression wave 110.

The degree of preloading necessary to maintain sealing contact of the conduit and the coupling body is dependent upon the pressure level in the conduit and is determined by the character of the compression wave or waves. Various parameters are taken into account in the design of the present fitting so as to produce an elastic compression wave of the character required to generate the degree of preloading necessary to effect a seal at the maximum working pressure for which the fitting is rated.

In FIG. 7, the diameter $d_1$ represents the sealing diameter of the sealing interface 112 against which pressure in conduit 26 acts. The net force thus imposed by pressure within the conduit can be computed by multiplying the expected internal pressure by the area against which the pressure acts (the area of a circle having a diameter $d_1$). The deformation of the ferrules needed to induce preloading in the conduit end with a force equal but opposite to the force acting on the conduit from internal pressure can thus be computed. The amount of compression wave-induced preloading imposed by the ferrules should be of a magnitude at least slightly in excess of the expected hydraulic force within the conduit and acting against the sealing surface of the conduit, thus to insure that the conduit will not become unseated under pressurization.

The function of the bleed passage 29 will now be described with reference to FIGS. 4 and 7. The net force imposed on the conduit by internal pressure is the product of that pressure times the area against which it acts.

Considering for a moment a coupling in which sealing is accomplished at the outside diameter of the tube at the zone of the grip exerted by the front ferrule (104, FIG. 4) along a diameter $d_3$ (FIG. 7), or at the zone of the interface of the front ferrule and the camming mouth along a diameter $d_2$ (FIG. 7), it will be obvious that the maximum force acts against a circle having a diameter $d_2$. A slightly smaller force acts against a circle having a diameter $d_3$. The force acting against a circle having a diameter $d_2$ will be considerably greater than a similar force acting against the smaller conical tip of the conduit sealing on a circle having a diameter $d_1$.

If for example $d_1$ is 0.125 inch, an internal pressure of 100,000 p.s.i. acting against the conical tip would impose a force of 1,230 pounds against the conduit. If internal pressure of the conduit were permitted to act directly against the circle having a diameter $d_2$ equal, for example, to 0.250 inch, an internal pressure of 100,000 p.s.i. would exert a force of 4,920 pounds.

Therefore, the net effect of conical sealing at the tip of the conduit is to reduce the force acting on the various parts of the coupling. In reducing the diameter of the sealing circle by one-half, the end thrust has been reduced by a factor of four. For this reason, sealing in the coupling of this invention as shown at FIG. 4 is accomplished entirely at the conical tip of the conduit; the ferrules functioning to grip the conduit and provide the preloading necessary to insure that the seal is maintained. In the event that leakage should occur at the conical tip, a bleed passage 29 is provided to conduct high pressure fluid to atmosphere rather than into the vicinity of the ferrules where the conduit could be subjected to much greater end thrust.

ANALYSIS OF DESIGN AND MATERIAL CONSIDERATIONS

Broadly stated, three major factors govern the establishment of the elastic compression wave utilized in effecting the seal. These are:

1. the geometry of the fitting components and of the tube;
2. the physical properties of these elements and their interrelationship with one another;
3. the relationship of the fitting and tube geometry to these physical properties.

To illustrate, consider that to achieve optimum sealing characteristics it is desirable to preload the conical tip of the tube by means of an elastic compression wave. Wave development is related to tube deformation, which is in turn produced by radial and axial forces applied to the tube by the ferrules.

The factors governing the magnitude of the forces required to produce deformation of the tube are its yield strength, shear strength and ductility. Obviously, the ferrules must therefore be capable of applying force to the degree required, in the light of these physical properties, to produce tube deformation.

The capacity of the ferrules to apply the requisite forces likewise depends upon the yield strength, shear strength and ductility of the materials from which they and the remaining coupling components are made, and the relationship of these physical properties to those of the tube.

Moreover, distribution of forces into ferrule deformation and into tube deformation affects the character of the elastic compression wave. The geometry of the various coupling components and of the tube, in turn, bears upon the nature of this force distribution.

Finally, since the magnitude of force required to achieve deformation of the proper character is influenced by the physical properties of the various elements, and since the distribution of forces is influenced by the geometry of these elements, it can be seen that there is a relationship between geometry and physical properties.

There is a degree of latitude available in adjusting the geometry of the various elements and in the selection of materials providing a range of physical properties, provided the existence of the foregoing interrelationships is kept in mind, together with the necessity for compatibility in the mating of particular physical properties and geometric relationships.

In the preferred embodiment of the invention, the components are made from a type of material having a yield strength generally as great or greater than the material of the tubing with which the coupling is to be used. Moreover, the component and the tube must be of ductile material so as to be able to withstand deformation under load without fracture.

With respect to the tubing used in the preferred embodiment of this invention the yield strength should be so related to the modulus of elasticity that the tubing will not buckle prematurely inasmuch as elastic preloading of the tube end is utilized to maintain sealing at the conical tip. Therefore, the tubing should be selected from those materials that provide sufficient yield strength and wall thickness to prevent premature buckling, but yet are without the high hardness that would inhibit the establishment of the elastic compression wave.

MODIFICATIONS OF THE COUPLING BODY

Figure 3:
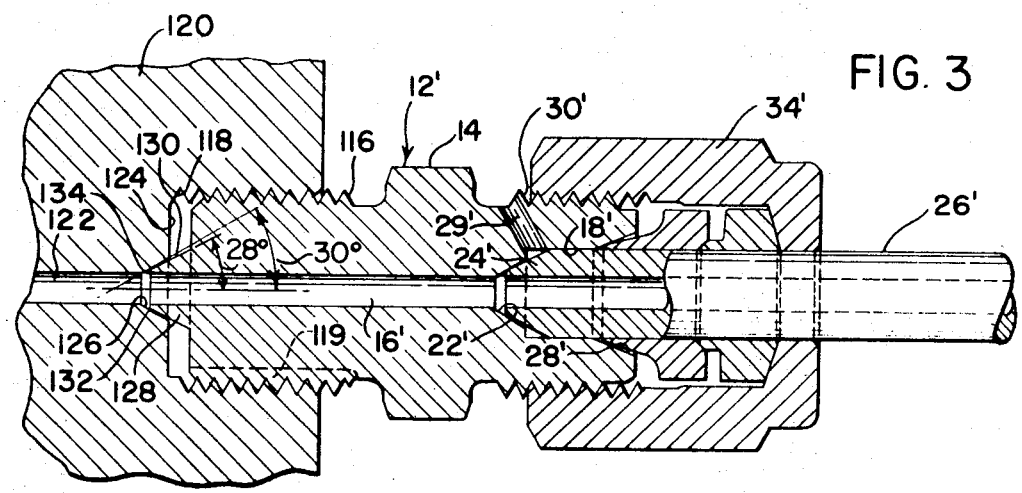
FIG. 3 is an enlarged fragmentary view, in longitudinal section, of the sealing and gripping device embodying the principles of this invention and showing a composite structure of the coupling body comprised of a male connector element and a connector member, and in which the coupling nut is in fingertight relationship with the male threads on the male connector element.

The discussion of the invention with respect to FIG. 1 has described a coupling body defined by a unitary structure 12 having a bore 16, a sealing surface 22, a radial shoulder 20, a counterbore 18, a camming mouth 28, tool-engaging pads 14, and a bleed passage 29. In the embodiment of the invention as shown in FIG. 1 male threads 30 are provided on the exterior surface of coupling body 12. Within the scope of this invention should also be considered various modifications and alternate forms of the coupling body. Several of the possible modifications will now be described with reference to FIGS. 3, 5, 6, and 10. Where possible, similar reference characters will be used throughout the description of the modifications of the coupling body as were used in the description of the invention of FIG. 1. Where elements are similar but not identical the prime superscript will be used with the reference character. In FIG. 3 the coupling body is a composite structure comprised of a male connector element 12' and a connector member 120. Male connector element 12' has a bore 16', sealing surface 22', bleed passage 29', counterbore 18', camming mouth 28' and male threads 30' adapted to be engaged by coupling nut 34'. The elements just described are similar to the elements of FIG. 1 and further description of them is believed to be unnecessary. In the embodiment of FIG. 3 the end of male connector element 12' opposite the end defining camming mouth 28' is provided with male threads 116 adapted to threadedly engage female threads 118 defining a female port in connector member 120. An axially extending slot 119 is cut in threads 118 to define a bleed passage for a purpose to be described below. Connector member 120 may be in the form of a flat plate, or other member to which it is desired to attach a conduit 26'. Connector member 120 is provided with a bore 122, a radial shoulder 124, and a frustoconical surface 126 interconnecting radial shoulder 124 with the wall defining bore 122. The connector member 120 just described including the bore 122, frustoconical surface 126, radial shoulder 124 and female threads 118 is a standard female port arrangement available to the industry. In order to adapt the female port to the coupling of this invention, male connector element 12' is provided with male threads 116 and a nose portion 128. Nose portion 128 is defined by a generally frustoconical surface 130 forming a predetermined forwardly extending half angle with respect to the axis of bore 16' and less than that defined by frustoconical surface 126 with respect to the axis of bore 122. Since the industry standard for frustoconical surface 126 specifies a half angle of 30° as shown in FIG. 3, a half angle of about 25° to about 29° is defined by frustoconical surface 130 of nose portion 128 with a half angle of about 28° being preferred. A curved apical zone 132 and a generally radial face 134 are defined at the forward end of nose portion 128.

In the operation of the invention as shown in FIG. 3, male connector element 12' is first inserted in the female port defined by the connector member 120 as by threadedly advancing male threads 116 into female threads 118 until the curved apical zone 132 of nose portion 128 comes into sealing contact with surface 126 of the connector member 120. Tool pads 14 and a suitable wrench may be used in the assembly just described. Thereafter, conduit 26' having a conical tip 24' is inserted into the coupling at which time takeup of the coupling nut provides for sealing and gripping of the conduit as previously described with reference to FIG. 1. In the event of leakage past apical zone 132, high-pressure fluid will be vented to atmosphere by slot 119 to reduce end thrust on the male connector element 12'. The male connector element 12' of FIG. 3, therefore, having a camming mouth 28' at one end thereof and male threads 116 at the other end thereof, provides a convenient adapter for connecting high-pressure conduit to a standard female port as used in industry.

A modification of the embodiment of FIG. 3 will now be described with reference to FIG. 10. In FIG. 10 male connector element 12a is shown having camming mouth 28a and male threads 30a adapted to be engaged by coupling nut 34a. Male threads 116a are provided on the male connector element and threadedly engage female threads 118a defined in a counterbore of connector member 120a. An axially extending slot 119a is cut in threads 118a to define a bleed passage. Connector member 120a is provided with a bore 122a, a radial shoulder 124a, and a frustoconical sealing surface 126a interconnecting radial shoulder 124a with the wall defining bore 122a. In contrast to the embodiment of FIG. 3, conduit 26a of FIG. 10 is inserted completely through the male connector element 12a such that the conical surface 24a of the conduit contacts sealing surface 126a of connector member 120a. The male connector element 12a and the connector member 120a thus define a composite coupling body structure having a bore 122a, sealing surface 126a, counterbore 16a and camming mouth 28a. Makeup of coupling nut 34a provides for sealing and gripping of the conduit as previously described with reference to FIG. 1. In contrast to the embodiment of FIG. 3, however, the primary sealing of the conduit of FIG. 10 takes place at the sealing surface 126a of connector member 120a. The embodiment of FIG. 10, therefore, eliminates the nose portion 128 of FIG. 3 as well as the sealing surface 22' of the male connector element.

The coupling body may take other forms than that shown in FIG. 3. As an example, the coupling body could be fabricated as a branched fitting in which a camming mouth 28 could be defined at one end of the coupling body and one of several connecting means (socket weld end, male threads, female threads, etc.) could be defined at the opposite end. Alternately, the coupling body could be fabricated in the form of a union, union elbow, union tee, or other shapes known to those skilled in the art.

Figure 5:
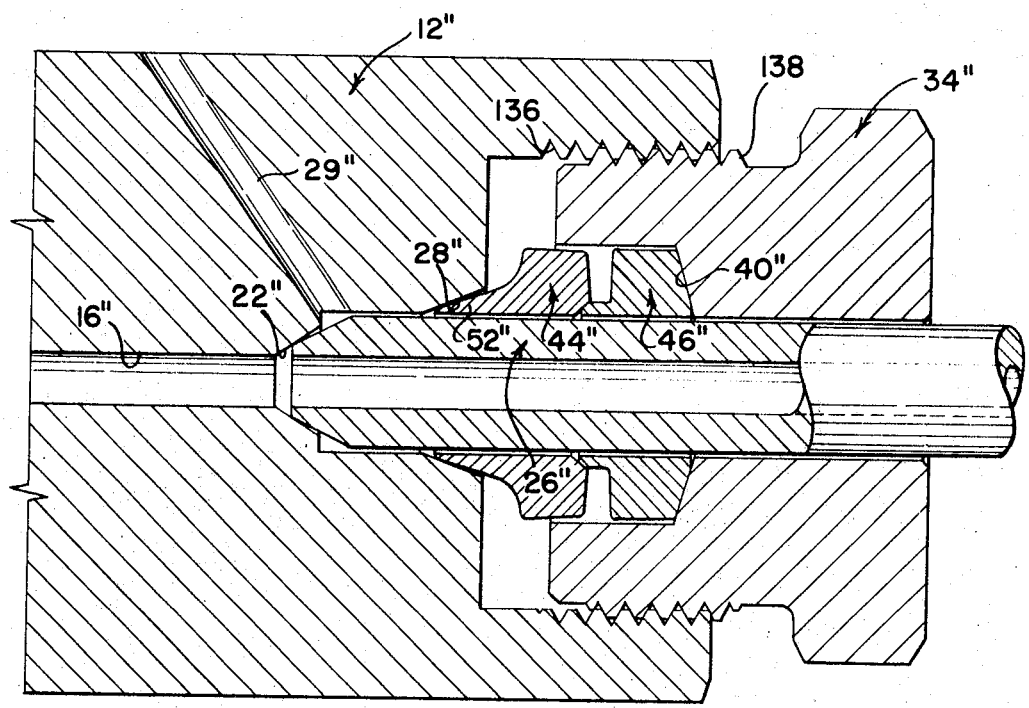
FIG. 5 is an enlarged fragmentary view, in longitudinal section, of a sealing and gripping device embodying the principles of this invention and showing the coupling nut in fingertight relationship with female threads on a modified coupling body.

In FIG. 5 there is shown a modification of the coupling body and the coupling nut wherein female threads 136 are defined in the coupling body 12" and male threads 138 are defined on an external surface of the coupling nut 34". As with FIG. 3 the prime superscript is used to designate elements similar but not identical to elements of FIG. 1. With the exception of the reversal of threads on the coupling nut and the coupling body, the remaining elements of the coupling nut and the coupling body of FIG. 5 are identical to those shown in FIG. 1. The makeup of the coupling of FIG. 5 is identical to that of FIG. 1 as the coupling nut 34" is advanced into the coupling body 12" thus to impart an axial compressive force to the back ferrule 46" by means of the thrust surface 40". The nose portion 52" of front ferrule 44' is subsequently brought into engagement with the external surface of conduit 26" as by being forced inwardly by means of camming mouth 28". For a more complete description of the operation of the invention as shown in FIG. 5 reference is made to the description of FIG. 1.

Figure 6:
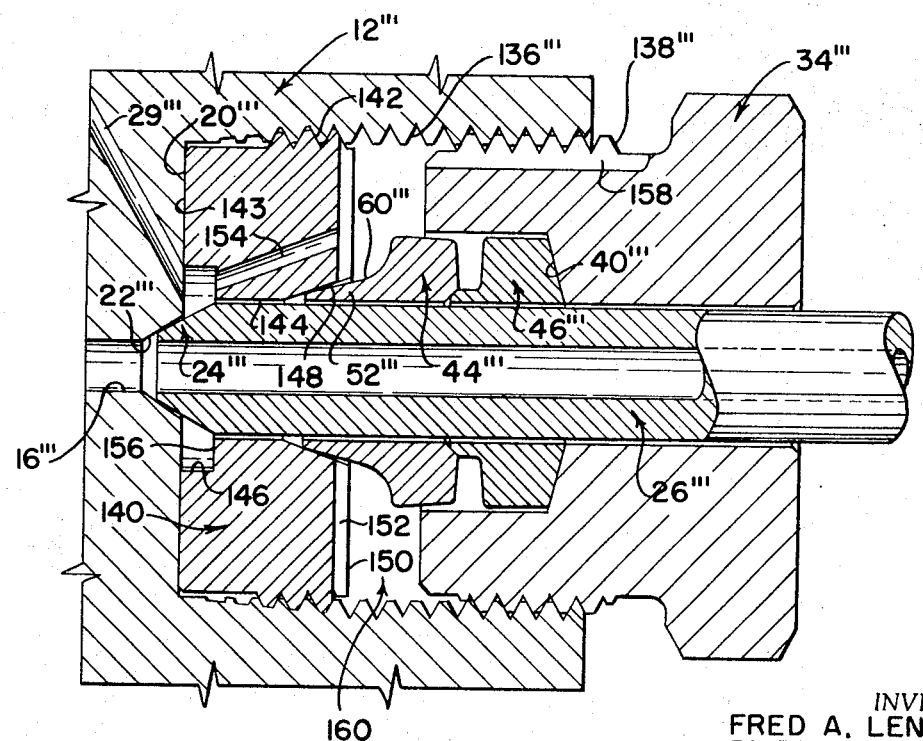
FIG. 6 is an enlarged fragmentary view, in longitudinal section, of the sealing and gripping device embodying the principles of this invention and showing a composite structure of the coupling body wherein the camming mouth is defined by a separate camming element.

In the modification of the invention as shown in FIG. 6 the coupling body is defined by a composite structure with the camming mouth of the coupling body defined by an annular camming element 140. The coupling body of FIG. 6 is thus defined by a composite structure comprised of a coupling body element 12''' and a camming element 140. Thus in the embodiment of FIG. 6 a coupling body element 12''' is defined including a bore 16''', a sealing surface 22''', a radial shoulder 20''', and female threads 136'''. A generally annular camming element 140 having male threads 142 thereon is threadedly received within coupling body element 12''' until the front face 143 of the camming element abuts radial shoulder 20''''. Camming element 140 need not be maintained in position by threads since any retaining means may be employed. Camming element 140 is defined by a bore 144 having a diameter slightly larger than the external diameter of conduit 26''' and a counterbore 146. A generally coaxial rearwardly opening frustoconical camming mouth 148 is provided in the camming element 140 to serve functionally the same purpose as camming mouth 28 of FIG. 1. The back face 150 of camming element 140 is provided with an elongated slot 152 for the purpose of receiving a screwdriver or other driving tool in order to advance the camming element 140 into the coupling body element 12'''.

The operation of the invention as embodied in the modification of FIG. 6 is similar to that described with reference to FIGS. 5 and 1. Having inserted the camming element 140 in the coupling body element 12''' and having positioned the ferrules 44''', 46''' in place by means of the coupling nut 34''', conduit 26''' is inserted into the coupling nut until conical tip 24''' is in engagement with sealing surface 22'''. Initial torquing of coupling nut 34''' imparts an axial compressive force to the back ferrule 46''' by means of thrust surface 40'''. Nose portion 52''' of the front ferrule 44''' is consequently cammed inwardly by camming mouth 148 into engagement with the external surface of conduit 26'''. As in the preferred embodiment of FIG. 1 camming mouth 148 defines a predetermined forwardly extending half angle with respect to the axis of bore 144 slightly exceeding the half angle defined by the tapered forward surface 60''' of nose portion 52'''.

As has been previously pointed out, it is desirable to provide a leak passage in the coupling of this invention so that high pressure fluid leaking past the conical tip 24''' of conduit 26''' may be conveyed to atmosphere. To this end, two possible bleed passages are shown in FIG. 6 either or both of which may be utilized. As with the embodiment of FIG. 1 a bleed passage 29''' is provided immediately behind the sealing surface 22''' and intersecting radial shoulder 20'''. Alternately, a bleed passage 154 may be defined in camming element 140 so as to intersect both wall 156 defined by counterbore 146 and the back face 150. An elongated axial slot 158 is defined in the external surface of coupling nut 34''' transverse to male threads 138''' in order to provide an escape passage for fluid within chamber 160 defined by the coupling body element, the camming element and the coupling nut. Thus, in the embodiment of FIG. 6 fluid escaping past the conical tip 24''' of conduit 26''' may be bled to atmosphere by means of either or both of the bleed passages 29''' or 154 and 158.

This invention should not be considered limited to the bleed passage structure as shown in the various figures as many alternate bleed passage designs are available to those well skilled in the art.

USE OF THE FERRULES FOR SEALING

Throughout the description of the invention thus far the ferrules have been described primarily as gripping elements for the purpose of gripping the tube and preloading the end of the tube to establish sealing at the conical tip thereof. Referring particularly to FIG. 7, it was pointed out that since the diameter $d_2$ greatly exceeded the diameter $d_1$ at the sealing diameter of the conical tip of the tube, it was desirable to establish a seal about a circle having the diameter $d_1$.

It should be pointed out, however, that in fact the ferrules do provide a sealing function at the outside diameter of the conduit and for certain pressure applications may be relied upon for both gripping and sealing the conduit. Therefore, the ferrules of this invention should not be considered as limited to the combination of conduit with a conical sealing tip, due to the fact that for certain lower pressure applications the ferrules may be used for both sealing and gripping the conduit whether or not a seal is provided by a conical tip. Naturally, if a coupling utilizing the ferrules of this invention were to provide sealing at the outside diameter of the conduit at the ferrules, all bleed passages should be eliminated as they would serve to defeat ferrule O. D. sealing.

PRIOR ART FERRULES COMPARED

A brief comparison will now be made between the front and back ferrules of this invention and the front and back ferrules of U.S. Pat. No. 3,103,373 to Lennon et al. Whereas the front ferrule 42 of Lennon U.S. Pat. No. 3,103,373 is generally in the configuration of a hollow right circular conical frustum, front ferrule 44 of this invention is defined by a substantially cylindrical body portion and an interconnected frustoconical nose portion. The body portion 50 of the instant invention serves the useful purpose of imparting a great deal of mass to the nose portion thus diminishing any tendency of the back portion of the front ferrule to flare outwardly during makeup of the coupling. It can be seen that any outward flaring of the back portion of the front ferrule during makeup would have the net effect of lessening the amount of deformation of the nose portion 52 of the front ferrule since some axial travel of the front ferrule would be converted to outwardly disposed radial travel. It is therefore considered desirable to impart pure axial travel to the front ferrule by means of the back ferrule without lost motion in the form of radial flaring. It can be appreciated that since the total stroke of the ferrule during makeup of the coupling is quite small, any radial expansion of the rearward portion of the front ferrule should be avoided so that the entire stroke of the back ferrule may be imparted to the front ferrule resulting in full inward camming of the nose portion 52. The body portion 50 of front ferrule 44 of this invention, therefore, serves to reduce substantially the risk of outward flaring of the front ferrule during makeup.

Distinctions between back ferrule 46 of this invention and back ferrule 44 of Lennon U.S. Pat. No. 3,103,373 will now be described. Whereas back ferrule 44 of Lennon U.S. Pat. No. 3,103,373 has a relatively long driving nose 63 to achieve a lockwasher action of the back ferrule, the back ferrule 46 of this invention is provided with a relatively short stub nose portion 78. Further differences in the back ferrules will be obvious from an examination of the respective body portions. Whereas body portion 70 of Lennon U.S. Pat. No. 3,103,373 is defined as an annular external radially extending flange having a thickness slightly exceeding the thickness of the nose portion and approximately one-half the thickness of the front ferrule at its thickest portion, body portion 76 of this invention is significantly thicker than nose portion 78 and, in fact, is of a mass approximating that of the body portion 50 of front ferrule 44. The net effect of the greatly enlarged body portion of the back ferrule is to present a rather large driving surface to the coupling nut 34 so as to impart axial thrust to the front ferrule without significant lost motion in radial movement of the back ferrule.

ADVANTAGES OF THE INVENTION

The sealing and gripping device of this invention provides for dependable coupling of relatively heavy-walled tubing for high-pressure application. Because the ferrules of this invention act directly on the conduit there is no reduction of tube wall thickness as experienced with threaded connections of the prior art. Consequently, there is no need to use heavier tubing than is normally required.

There is no danger of a threaded sleeve changing position on the threaded tube end when the coupling is disassembled or assembled as is a common experience of the prior art. The ferrules of this invention will grip the tube in precisely the correct position.

It is virtually impossible to overtighten the coupling of this invention. Whereas in prior structures wherein a threaded collar is disposed on a tube end and the axial position of the threaded collar may be changed relative to the tube, makeup of the coupling of this invention is a function of ferrule deformation which consequently is a direct function of the torquing of the coupling nut. Since in the preferred embodiment of the invention the relationship of parts is such that a predetermined number of turns of the coupling nut produces full makeup of the coupling, proper tightening is easily checked by either monitoring rotation of the coupling nut, counting the exposed threads, or measuring the distance E, FIG. 4, as by means of a suitable inspection gauge thus to determine that the coupling nut 34 has been properly torqued. Since any overtightening of the coupling nut produces greater deformation of the ferrules, most of the overtightening is absorbed by the ferrules.

Consider for a moment the embodiment of FIG. 4. Further tightening of coupling nut 34 will cause the forward face of ferrule 46 to move toward the rearward face of ferrule 44. When contact of the respective faces of the ferrules is made, during overtightening of the coupling nut, the resistance of the coupling to further tightening increases sharply.

Similarly, overtightening of the coupling nut 34 of FIG. 4 will advance ferrule 44 into engagement with the entire camming mouth 28 at an area of engagement 106. Further tightening will result in a sharp increase in resistance as the concave surface 70 contacts the edge of the camming mouth 28.

The increase in resistance brought about by overtightening as the ferrules 44, 46 butt one another and the concave surface 70 contacts camming mouth 28 considerably increases the torque requirements of the fitting. Further torquing with ordinary hand tools is virtually impossible. Since conduit sealing is maintained with the coupling in the overtightened condition wherein the ferrules abut, and since further tightening is prohibitive, there is no danger of breaking the seal with overtightening.

In contrast to this invention are couplings of the threaded connection type wherein tightening of the coupling nut produces a direct and linear advance of the tip of the tube into engagement with the coupling body. The net effect of overtightening the nut of threaded-type couplings (wherein a collar is threadedly secured to the end of a tube) is to either (a) strip the threads on the tube end or (b) force the tube end into the coupling body to such a degree that the tube will be constricted or closed at its end. Closure of tubing utilizing the instant invention is prevented by the positive controlled deformation of the ferrules which result in preloading of the tube end.

Experience has shown that once a sealing and gripping device embodying this invention has been joined to a conduit, the joint may be made and remade a number of times without materially impairing performance. A reliable, leaktight seal is accomplished each time the coupling is made up.

In addition to establishing a fluidtight seal at the conical tip of the conduit, the elastic wave 110, FIG. 8, also serves to impose a springlike load on the coupling nut as the coupling is made up. The coupling of this invention is thus capable of withstanding vibrations and other forces that have been known to loosen the coupling nut of prior art fittings.

For ease of description, the principles of the invention have been set forth in connection with a preferred embodiment and several modifications. It is not our intention that the embodiments illustrated nor the terminology employed in describing them be limited, inasmuch as variations in these may be made without departing from the spirit of the invention. Rather, we desire to be restricted only by the scope of the appended claims.

We claim:

1. A fitting comprising:
   a conduit having a substantially cylindrical exterior surface and a generally frustoconical forwardly converging sealing surface at one end thereof said sealing surface having been formed on said conduit prior to initial makeup of said fitting;
   a coupling body having a bore, a counterbore for receiving said conduit, and a generally frustoconical rearwardly opening sealing surface, said counterbore being substantially cylindrical throughout a portion of its length and being provided with a coaxial generally frustoconical rearwardly opening camming mouth adapted to surround said conduit when inserted in said coupling body, said camming mouth forming a predetermined forwardly extending half angle with respect to the axis of said coupling body counterbore;
   ferrule means having a bore and including a generally frustoconical forwardly converging nose portion defining a half angle with respect to the axis of said ferrule means bore less than the half angle defined by said camming mouth, the rearward end of said ferrule means being provided with a backface;
   said ferrule means being deformed into gripping engagement with said conduit as by moving said nose portion in a forward direction into a camming mouth so as to be cammed inwardly into engagement with the exterior surface of said conduit producing deformation of said conduit;
   the portion of said conduit gripped by said ferrule means having a substantially uniform outside diameter prior to deformation of said ferrule means;
   a coupling nut threadedly engaged with said coupling body and provided with a thrust surface disposed in axially spaced opposition to said camming mouth and engaging said backface of said ferrule means, said coupling nut and camming mouth together defining an annular chamber surrounding said conduit when inserted in said coupling body, within which said ferrule means is adapted to be received;
   the relationship of parts being such that upon torquing of said coupling nut said conduit is driven forward thus advancing said conduit sealing surface into sealing abutment with said coupling body sealing surface establishing a high integrity seal on a diameter less than the inside diameter of said ferrule means in a deformed state;
   the yield stress of said conduit in compression being such that said conduit maintains a thrust load on said coupling body sealing surface of a magnitude substantially equal to or greater than the hydraulic force within said conduit acting against said conduit sealing surface.

2. The invention of claim 1 in which said coupling body is defined as a composite structure comprised of a male connector element and a connector member with said bore and said sealing surface defined by said connector member and said counterbore and said camming mouth defined by said male connector element with said coupling nut threadedly engaged with said male connector element.

3. The invention of claim 1 in which said coupling body is defined as a composite structure comprised of a coupling body element and a camming element with said bore and said sealing surface defined by said coupling body element and said counterbore and said camming mouth defined by said camming element with said coupling nut threadedly engaged with said coupling body element.

4. A fitting comprising:
   a conduit having a substantially cylindrical exterior surface and a generally frustoconical forwardly converging sealing surface at one end thereof said sealing surface having been formed on said conduit prior to initial makeup of said fitting;
   a coupling body having a bore, a counterbore for receiving said conduit, and a generally frustoconical rearwardly opening sealing surface, said counterbore being substantially cylindrical throughout a portion of its length and being provided with a coaxial generally frustoconical rearwardly opening camming mouth adapted to surround said conduit when inserted in said coupling body, said camming mouth forming a predetermined forwardly extending half angle with respect to the axis of said coupling body counterbore;
   ferrule means received upon said conduit, said ferrule means having a bore and including a generally frustoconical forwardly converging nose portion defining a half angle with respect to the axis of said ferrule means bore less than the half angle defined by said camming mouth, the rearward end of said ferrule means being provided with a backface;
   a coupling nut threadedly engaged with said coupling body and provided with a thrust surface disposed in axially spaced opposition to said camming mouth and engaging said backface of said ferrule means, said coupling nut and camming mouth together defining an annular chamber surrounding said conduit when inserted in said coupling body, within which said ferrule means is adapted to be received;
   the relationship of the parts being such that upon initial torquing of said coupling nut, said nose portion of said ferrule means is moved in a forward direction into said camming mouth thereby to be cammed inwardly into engagement with the exterior surface of said conduit producing deformation of said conduit;
   upon further torquing of said coupling nut said conduit is driven forward thus advancing said conduit sealing surface into sealing abutment with said coupling body sealing surface establishing a high integrity seal on a diameter less than the inside diameter of said ferrule means in deformed state;
   the portion of said conduit gripped by said ferrule means having a substantially uniform outside diameter prior to deformation of said ferrule means;
   the yield stress of said conduit in compression being such that said conduit maintains a thrust load on said coupling body sealing surface of a magnitude substantially equal to or greater than the hydraulic force within said conduit acting against said conduit sealing surface.

5. The invention of claim 4 in which said frustoconical sealing surface of said conduit prior to makeup of the fitting defines a half angle with respect to the axis of said coupling body counterbore less than the half angle defined by said frustoconical sealing surface of said coupling body with respect to the axis of said coupling body counterbore.

6. The invention of claim 5 in which the difference in recited sealing surface half angles is in the range of about 1° to about 5°.

7. The invention of claim 5 in which the difference in recited sealing surface half angles is about 2°.

8. The invention of claim 4 in which said ferrule means is further defined as:
   a front ferrule received upon said conduit and defined by a body portion having substantially the form of a right circular cylinder and a nose portion having substantially the form of a right circular forwardly converging conical frustum, the exterior surfaces of said body portion and said nose portion being interconnected by a generally concave annular surface, said body portion including a radial base having a frustoconical surface, said right circular forwardly converging conical frustum defining a tapered external forward surface portion,
   back ferrule received upon said conduit adjacent said front ferrule and rearwardly thereof, said back ferrule being defined by a right circular substantially cylindrical body portion and a nose portion, the forward end of the nose portion of said back ferrule having an external forwardly converging generally frustoconical surface received within the frustoconical surface of said front ferrule, the rearward end of said back ferrule being provided with a generally frustoconical rearwardly converging backface carried on the back ferrule body portion.

9. The invention of claim 4 in which said ferrule means is defined by a front ferrule and a back ferrule received upon said conduit, said nose portion being defined on said front ferrule and said backface being defined on said back ferrule.

10. The invention of claim 4 in which a bleed passage to atmosphere is defined in said coupling body providing communication to the interior of said coupling body at a location between said coupling body sealing surface and said ferrule means.

11. The invention of claim 4 in which said coupling nut threadedly engages external threads of said coupling body.

12. The invention of claim 4 in which said coupling nut threadedly engages internal threads of said coupling body.

13. The invention of claim 4 in which said coupling body is defined by a composite structure including a coupling body element and a generally annular camming element, said bore and said coupling body sealing surface being defined by said coupling body element, and said counterbore and said camming mouth being defined by said annular camming element, the composite structure being arranged such that said conduit is inserted through said camming element and into said coupling body element.

14. The invention of claim 13 in which said annular camming element is threadedly received within said coupling body element.

15. The invention of claim 13 in which a bleed passage to atmosphere is defined in said coupling body element providing communication to the interior of said coupling body element at a location between the sealing surface of said coupling body element and said ferrule means.

16. The invention of claim 13 in which a bleed passage to atmosphere is defined in said camming element and said coupling nut providing communication to the interior of said coupling body element at a location between the sealing surface of said coupling body element and said ferrule means.

17. A fitting comprising:
a conduit having a substantially cylindrical exterior surface and a generally frustoconical forwardly converging sealing surface at one end thereof said sealing surface having been formed on said conduit prior to initial makeup of said fitting;
a coupling body defined by a composite structure including a male connector element and a connector member;
said male connector element having a first end, a second end, a bore, a counterbore at said first end for receiving said conduit, and a sealing surface at said first end, said counterbore being substantially cylindrical throughout a portion of its length and being provided with a coaxial rearwardly opening generally frustoconical camming mouth adapted to surround said conduit when inserted in the male connector element at said first end, said camming mouth forming a predetermined forwardly extending half angle with respect to the axis of said counterbore, said second end of said male connector element being provided with external threads adapted to be received within said connector member;
said connector member having a bore, a counterbore having internal threads and a generally frustoconical sealing surface;
said second end of said male connector element further including a nose portion adapted to sealingly abut said frustoconical sealing surface of said connector member as said second end is advanced into said connector member;
ferrule means received upon said conduit, said ferrule means having a bore and including a generally frustoconical forwardly converging nose portion defining a half angle with respect to the axis of said ferrule means bore less than the half angle defined by said camming mouth, the rearward end of said ferrule means being provided with a backface;

a coupling nut threadedly engaged with said male connector element and provided with a thrust surface disposed in axially spaced opposition to said camming mouth and engaging said backface of said ferrule means, said coupling nut and camming mouth together defining an annular chamber surrounding said conduit when inserted in said male connector element, within which said ferrule means is adapted to be received;
the relationship of the parts being such that upon initial torquing of said coupling nut, said nose portion of said ferrule means is moved in a forward direction into said camming mouth thereby to be cammed radially inwardly into engagement with the exterior surface of said conduit producing deformation of said conduit;
upon further torquing of said coupling nut said conduit is driven forward thus advancing said conduit sealing surface into sealing abutment with said male connector element sealing surface establishing a high integrity seal on a diameter less than the inside diameter of said ferrule means in a deformed state;
the portion of said conduit gripped by said ferrule means having a substantially uniform outside diameter prior to deformation of said ferrule means;
the yield stress of said conduit in compression being such that said conduit maintains a thrust load on said male connector element sealing surface of a magnitude substantially equal to or greater than the hydraulic force within said conduit acting against said conduit sealing surface.

18. The invention of claim 17 in which said nose portion of said male connector element is integral with said male connector element.

19. The invention of claim 17 in which said nose portion of said male connector element is further defined as a generally frustoconical surface at said second end of said male connector element, the frustoconical surface of said connector member defining a half angle with respect to the axis of said connector member counterbore greater than the half angle defined by the frustoconical surface of said nose portion of said male connector element.

20. The invention of claim 17 in which a bleed passage to atmosphere is defined in said male connector element at said first end providing communication to the interior of said male connector element at a location between said male connector element sealing surface and said ferrule means.

21. The invention of claim 17 in which a bleed passage to atmosphere is defined in said male connector element at said second end providing communication to the interior of said connector member at said male connector element nose portion.

22. A fitting comprising:
a conduit having a substantially cylindrical exterior surface and a generally frustoconical forwardly converging sealing surface at one end thereof said sealing surface having been formed on said conduit prior to initial makeup of said fitting;
a coupling body defined by a composite structure including a male connector element and a connector member;
said connector member having a bore, a counterbore, and a sealing surface, said counterbore of said connector member adapted to receive said male connector element;
said male connector element including a bore and a rearwardly opening, generally frustoconical camming mouth adapted to surround said conduit when inserted through said male connector element and into engagement with said connector member, said camming mouth forming a predetermined forwardly extending half angle with respect to the axis of said bore of said male connector element;
ferrule means received upon said conduit, said ferrule means having a bore and including a generally frustoconical forwardly converging nose portion defining a half angle with respect to the axis of said ferrule means bore less than the half angle defined by said camming mouth, the rearward end of said ferrule means being provided with a backface;

a coupling nut threadedly engaged with said male connector element and provided with a thrust surface disposed in axially spaced opposition to said camming mouth and engaging said backface of said ferrule means, said coupling nut and camming mouth together defining an annular chamber surrounding said conduit when inserted in said coupling body, within which said ferrule means is adapted to be received;

the relationship of the parts being such that upon initial torquing of said coupling nut, said nose portion of said ferrule means is moved in a forward direction into said camming mouth thereby to be cammed inwardly into engagement with the exterior surface of said conduit producing deformation of said conduit;

upon further torquing of said coupling nut said conduit is driven forward thus advancing said conduit sealing surface into sealing abutment with said connector member sealing surface establishing a high integrity seal on a diameter less than the inside diameter of said ferrule means in a deformed state;

the portion of said conduit gripped by said ferrule means having a substantially uniform outside diameter prior to deformation of said ferrule means;

the yield stress of said conduit in compression being such that said conduit maintains a thrust load on said connector member sealing surface of a magnitude substantially equal to or greater than the hydraulic force within said conduit acting against said conduit sealing surface.

23. The invention of claim 22 in which a bleed passage to atmosphere is defined in said male connector element providing communication to the interior of said connector member at said conduit sealing surface.

24. A fitting comprising:

a conduit having a substantially cylindrical exterior surface and a generally frustoconical forwardly converging sealing surface at one end thereof said sealing surface having been formed on said conduit prior to initial makeup of said fitting;

a coupling body having a bore, a counterbore for receiving said conduit, and a generally frustoconical rearwardly opening sealing surface, said counterbore being substantially cylindrical throughout a portion of its length and being provided with a coaxial generally frustoconical rearwardly opening camming mouth adapted to surround said conduit when inserted in said coupling body, said camming mouth forming a predetermined forwardly extending half angle with respect to the axis of said coupling body counterbore;

ferrule means received upon said conduit, said ferrule means having a bore and including a generally frustoconical forwardly converging nose portion defining a half angle with respect to the axis of said ferrule means bore less than the half angle defined by said camming mouth, the rearward end of said ferrule means being provided with a backface;

a coupling nut threadedly engaged with said coupling body and provided with a thrust surface disposed in axially spaced opposition to said camming mouth and engaging said backface of said ferrule means, said coupling nut and camming mouth together defining an annular chamber surrounding said conduit when inserted in said coupling body, within which said ferrule means is adapted to be received;

the portion of said conduit gripped by said ferrule means having a substantially uniform outside diameter prior to deformation of said ferrule means;

the relationship of the parts being such that upon application of a substantially axial compressive force to said ferrule means, said ferrule means becomes slightly deformed thereby to come into contact with said conduit and apply local force around the circumference of said conduit, said local force having a first force component normal to the axis of said ferrule means bore and acting to reduce the diameter of said conduit at said ferrule means, and a second force component parallel to the axis of said ferrule means bore and acting to place an axial compressive stress in said conduit;

upon further application of a substantially axial compressive force said ferrule means becomes more deformed and advances toward said conduit sealing surface thus to preload said one end of said conduit establishing a high integrity seal on a diameter less than the inside diameter of said ferrule means in a deformed state;

the yield stress of said conduit in compression being such that said conduit maintains a thrust load on said coupling body sealing surface of a magnitude substantially equal to or greater than the hydraulic force within said conduit acting against said conduit sealing surface.

25. A fitting comprising:

a conduit having a substantially cylindrical exterior surface and a generally frustoconical forwardly converging sealing surface at one end thereof said sealing surface having been formed on said conduit prior to initial makeup of said fitting;

a coupling body having a bore, a counterbore for receiving said conduit, and a generally frustoconical rearwardly opening sealing surface, said counterbore being substantially cylindrical throughout a portion of its length and being provided with a coaxial generally frustoconical rearwardly opening camming mouth adapted to surround said conduit when inserted in said coupling body, said camming mouth forming a predetermined forwardly extending half angle with respect to the axis of said coupling body counterbore;

ferrule means received upon said conduit, said ferrule means having a bore and including a generally frustoconical forwardly converging nose portion defining a half angle with respect to the axis of said ferrule means bore less than the half angle defined by said camming mouth, the rearward end of said ferrule means being provided with a backface;

a coupling nut threadedly engaged with said coupling body and provided with a thrust surface disposed in axially spaced opposition to said camming mouth and engaging said backface of said ferrule means, said coupling nut and camming mouth together defining an annular chamber surrounding said conduit when inserted in said coupling body, within which said ferrule means is adapted to be received;

the portion of said conduit gripped by said ferrule means having a substantially uniform outside diameter prior to deformation of said ferrule means;

the relationship of the parts being such that upon application of a substantially axial compressive force to said ferrule means, said ferrule means becomes slightly deformed thereby to come into contact with said conduit and induce an elastic compression wave in said conduit, the wave-inducing force imparted to said conduit by said ferrule means having a first force component normal to the axis of said ferrule means bore and acting to maintain said ferrule means in contact with said conduit and a second force component parallel to the axis of said ferrule means bore and acting to advance said wave toward said one end of said conduit thus to advance said conduit sealing surface into sealing abutment with said coupling body sealing surface;

upon further application of a substantially axial compressive force said ferrule means becomes more deformed to preload elastically said one end of said conduit establishing a high integrity seal on a diameter less than the inside diameter of said ferrule means in a deformed state;

the yield stress of said conduit in compression being such that said conduit remains sufficiently elastic upon deformation of said ferrule means thus to maintain a thrust load on said coupling body sealing surface of a magnitude substantially equal to or greater than the hydraulic force within said conduit acting against said conduit sealing surface.

26. A phased controlled sequential tube fitting comprising:

a coupling body having a bore, a counterbore for receiving a tube, said counterbore being substantially cylindrical throughout a portion of its length and being provided with a coaxial generally frustoconical rearwardly opening camming mouth adapted to surround a tube when inserted in said coupling body, said camming mouth forming a predetermined forwardly extending half angle with respect to the axis of said coupling body counterbore;

a front ferrule adapted to be received upon a tube and defined by a body portion having substantially the form of a right circular cylinder and a nose portion having substantially the form of a right circular forwardly converging conical frustum, the exterior surfaces of said body portion and said nose portion being interconnected by a generally concave surface, the external surface of said nose portion, prior to makeup of the fitting, defining a half angle with respect to the axis of said counterbore less than that defined by said camming mouth, a front ferrule bore defined within said front ferrule coaxial with the counterbore of said coupling body, the forward end of the nose portion of said front ferrule terminating with a curved apical zone, the front ferrule being provided at the rearward end thereof with a coaxial rearwardly opening generally frustoconical surface joining the radial base of the front ferrule with the wall defining the bore of the front ferrule, said frustoconical surface of said front ferrule having a radial extent at its intersection with the radial base, substantially less than half the greatest difference between the inner and outer radii of the front ferrule body portion;

a back ferrule adapted to be received upon a tube adjacent said front ferrule and rearwardly thereof, said back ferrule being defined by a right circular substantially cylindrical body portion and a nose portion, the back ferrule being provided with a back ferrule bore coaxial with said counterbore of said coupling body, the outer diameter of the body portion of said back ferrule being substantially equal to the outer diameter of the body portion of said front ferrule, the greatest radial thickness of the nose portion of said back ferrule being substantially less than one-half the greatest difference between the inner and outer radii of the body portion of said back ferrule, the forward end of the nose portion of said back ferrule having an external forwardly converging generally frustoconical surface received within said frustoconical surface of said front ferrule, the rearward end of said back ferrule being provided with a generally frustoconical rearwardly converging backface defined on the body portion;

a coupling nut threadedly engaged with said coupling body and provided with a coaxial internal rearwardly converging generally frustoconical thrust surface disposed in axially spaced opposition to the camming mouth and engaging the backface of said back ferrule, the coupling nut and the camming mouth together defining an annular chamber surrounding a tube when inserted in the coupling body, within which the front and back ferrules are received;

the relationship of the parts being such that upon application of a substantially axial compressive force to said ferrules a major part of the front ferrule deformation will be accomplished prior to the time deformation of the back ferrule is initiated.